(12) United States Patent
Kim et al.

(10) Patent No.: US 10,407,025 B2
(45) Date of Patent: Sep. 10, 2019

(54) VEHICLE AND METHOD OF CONTROLLING THE SAME

(71) Applicants: Hyundai Motor Company, Seoul (KR); Kia Motors Corporation, Seoul (KR); Seoul National University R&DB Foundation, Seoul (KR)

(72) Inventors: Sinjung Kim, Gyeonggi-do (KR); Eun-Sang Lee, Seoul (KR); Wi-Jik Lee, Daegu (KR); Chang-Min Cho, Seoul (KR); Jong-Seon No, Seoul (KR); Young-Sik Kim, Gwangju (KR)

(73) Assignees: Hyundai Motor Company, Seoul (KR); Kia Motors Corporation, Seoul (KR); Seoul National University R&DB Foundation, Seoul (KR)

( * ) Notice: Subject to any disclaimer, the term of this patent is extended or adjusted under 35 U.S.C. 154(b) by 296 days.

(21) Appl. No.: 15/385,625

(22) Filed: Dec. 20, 2016

(65) Prior Publication Data
US 2018/0065597 A1 Mar. 8, 2018

(30) Foreign Application Priority Data
Sep. 7, 2016 (KR) .................. 10-2016-0114991

(51) Int. Cl.
| | |
|---|---|
| *B60R 25/24* | (2013.01) |
| *B60R 25/20* | (2013.01) |
| *G07C 9/00* | (2006.01) |
| *G01S 13/84* | (2006.01) |

(52) U.S. Cl.
CPC ............ *B60R 25/24* (2013.01); *B60R 25/209* (2013.01); *G07C 9/00309* (2013.01); *G01S 13/84* (2013.01)

(58) Field of Classification Search
CPC ... B60R 25/24; B60R 25/209; G07C 9/00309; G01S 13/84
See application file for complete search history.

(56) References Cited

U.S. PATENT DOCUMENTS

| | | | |
|---|---|---|---|
| 6,483,425 B1 | 11/2002 | Avenel | |
| 9,637,086 B2 * | 5/2017 | Sanji | ........................ B60R 25/24 |
| 2003/0043023 A1 * | 3/2003 | Perraud | ................ G06K 7/0008 340/10.1 |
| 2006/0273888 A1 * | 12/2006 | Yamamoto | .............. B60R 25/24 340/426.36 |

(Continued)

FOREIGN PATENT DOCUMENTS

| | | |
|---|---|---|
| JP | 2000185627 A | 7/2000 |
| JP | 2012060482 A | 3/2012 |

(Continued)

*Primary Examiner* — Thomas D Alunkal
(74) *Attorney, Agent, or Firm* — Slater Matsil, LLP

(57) ABSTRACT

A vehicle includes a low frequency (LF) transmitter, a high frequency receiver, and a control unit. The low frequency (LF) transmitter may be configured to transmit a LF signal in order to search for a remote control device. The high frequency receiver may be configured to receive a signal having a predetermined frequency band which is greater than a frequency band of the LF signal transmitted by the LF transmitter. The control unit may be configured to determine that a relay attack is generated when the signal received by the high frequency receiver is a modulated LF signal.

19 Claims, 9 Drawing Sheets

(56) References Cited

U.S. PATENT DOCUMENTS

| | | | | |
|---|---|---|---|---|
| 2008/0143500 A1* | 6/2008 | Ghabra | ............... | B60R 25/24 |
| | | | | 340/426.36 |
| 2014/0203907 A1* | 7/2014 | Ohata | ............... | G07C 9/00309 |
| | | | | 340/5.61 |
| 2014/0215567 A1 | 7/2014 | Yoshizawa et al. | | |
| 2014/0327517 A1* | 11/2014 | Portet | ............... | G01S 13/84 |
| | | | | 340/5.61 |
| 2015/0074805 A1* | 3/2015 | Choi | ............... | H04W 12/08 |
| | | | | 726/22 |

FOREIGN PATENT DOCUMENTS

| | | | |
|---|---|---|---|
| JP | 2013108255 A | 6/2013 | |
| JP | 2014146878 A | 8/2014 | |
| JP | 2016117991 A | 6/2016 | |

\* cited by examiner

VEHICLE AND METHOD OF CONTROLLING THE SAME

CROSS-REFERENCE TO RELATED APPLICATIONS

This application claims the benefit of Korean Patent Application No. 10-2016-0114991, filed on Sep. 7, 2016 in the Korean Intellectual Property Office, the disclosure of which is incorporated herein by reference.

TECHNICAL FIELD

Embodiments of the present disclosure relate to a vehicle, and a method of controlling the same.

BACKGROUND

A vehicle remote control system is a system in which a driver can lock and unlock a door of a vehicle and start an engine of the vehicle in the outside without inserting a separate key into a key box or performing special manipulation for an operation, and a remote control device such as a smart card which is able to be easily handheld, or a key fob for wireless communication, etc. is used.

When a driver possessing the remote control device accesses the vehicle, the lock is automatically released through a low frequency (LF) communication or a radio frequency (RF) communication with the remote control device, the door may be unlocked without inserting the separate key, and the engine may be started without inserting a start key after riding in the vehicle.

In detail, a remote control system of the vehicle performs i) an LF signal transmission operation of transmitting an authentication request signal to the remote control device, and ii) an RF signal reception operation of receiving an authentication response signal from the remote control device. In this case, the remote control system of the vehicle may receive the authentication response signal from the remote control device only when the remote control device is present to be close to the vehicle due to a transmission distance limitation of the LF signal having a relatively low frequency band compared with the RF signal.

Due to a characteristic of the remote control system, recently, a hacking problem of a wireless signal of a relay of collecting the LF signal transmitted from the vehicle through an antenna, etc. present at a short distance from the vehicle and transmitting the collected LF signal to the remote control device present at a long distance from the vehicle, and allowing the remote control device to directly transmit the RF signal to the vehicle or again collecting the RF signal through the antenna, etc. and transmitting the collected RF signal to the vehicle, that is, a relay attack, is being generated.

SUMMARY

Therefore, it is an aspect of the present disclosure to provide a vehicle sensing a case in which a relay tries a relay attack, and a method of controlling the same.

Additional aspects of the disclosure will be set forth in part in the description which follows and, in part, will be obvious from the description, or may be learned by practice of the disclosure.

In accordance with one aspect of the present disclosure, a vehicle includes a low frequency (LF) transmitter, a high frequency receiver, and a control unit. The low frequency (LF) transmitter may be configured to transmit a LF signal in order to search for a remote control device, the high frequency receiver may be configured to receive a signal having a predetermined frequency band which is higher than a frequency band of the LF signal transmitted by the LF transmitter, and the control unit may be configured to determine that a relay attack is generated when the signal received by the high frequency receiver is a modulated LF signal.

The vehicle may further include a radio frequency (RF) receiver configured to receive an RF signal including authentication information. The high frequency receiver receives a signal having a predetermined frequency band which is higher than a frequency band of the RF signal, and the control unit may determine that the relay attack is generated when the RF signal is received and the signal received by the high frequency receiver received is the modulated LF signal.

The vehicle may further include a storage unit configured to store the authentication information mutually shared with the remote control device. The control unit may determine that the relay attack is generated when the authentication information included in the RF signal is equal to the authentication information stored in the storage unit and the signal received by the high frequency receiver is the modulated LF signal.

A plurality of predetermined frequency bands are included.

The vehicle may further include a storage unit configured to store a priority on each of the plurality of predetermined frequency bands. The high frequency receiver may receive the signal in the frequency bands having a priority defined in the sequence which is from a high frequency band to a low frequency band.

The high frequency receiver may include a plurality of high frequency signal demodulation modules demodulating signals in the plurality of predetermined frequency bands, respectively.

The high frequency receiver may include a high frequency signal demodulation module demodulating the signal.

The LF transmitter may transmit the LF signal including an identification (ID) mutually shared with the remote control device, and the control unit may determines that the relay attack is generated when the ID is detected based on a result demodulated by the high frequency signal demodulation module.

The control unit may stop transmitting the LF signal when determining that the relay attack is generated.

In accordance with another aspect of the present disclosure, a method of controlling a vehicle includes: transmitting a LF signal in order to search for a remote control device; receiving a signal having a predetermined frequency band which is higher than a frequency band of the LF signal; and determining that a relay attack is generated when the signal received in the receiving of the signal is a modulated LF signal.

The method of controlling the vehicle, before the determining of that the relay attack is generated, may further include receiving an RF signal including authentication information. The receiving of the signal receives a signal having a predetermined frequency band which is higher than a frequency band of the RF signal, and the determining of that the relay attack is generated may determine that the relay attack is generated when the RF signal is received and the signal received in the receiving of the signal is the modulated LF signal.

The determining of that the relay attack is generated may determine that the relay attack is generated when the authentication information included in the RF signal is equal to the authentication information stored in the vehicle and the signal received in the receiving of the signal is the modulated LF signal.

A plurality of predetermined frequency bands may be included.

A priority on each of the plurality of predetermined frequency bands may be previously set, and the receiving of the signal may receive the signal in the frequency bands having a priority defined in the sequence which is from a high frequency band to a low frequency band.

The receiving of the signal may include demodulating the signal in each of the plurality of predetermined frequency bands.

The receiving of the signal may include demodulating the signal.

The transmitting of the LF signal may transmit the LF signal including an identification (ID) mutually shared with the remote control device, and the determining of that the relay attack is generated may determine that the relay attack is generated when the ID is detected based on a result obtained in the demodulating of the signal.

The method of controlling the vehicle may further include stopping transmitting the LF signal when it is determined that the relay attack is generated.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF ILLUSTRATIVE EMBODIMENTS

Figure 1:
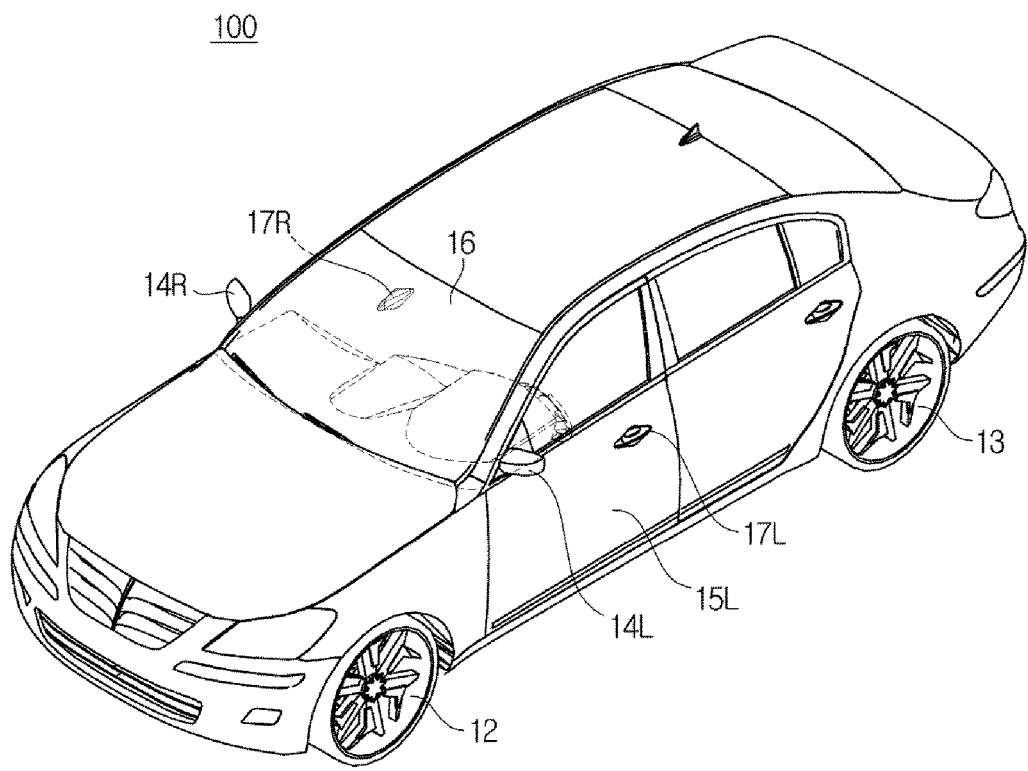
FIG. 1 is an exterior view of a vehicle according to one embodiment.

Hereinafter, exemplary embodiments of the present disclosure will be described in detail with reference to the accompanying drawings. Additional objects, features and operational advantages, including the object, constitution and effects of the present disclosure, will become more apparent from the detailed description of the preferred embodiments. In this specification, when reference numerals are assigned to components of each drawing, it should be noted that, although the same components are illustrated in different drawings, the same numerals are assigned as much as possible. Further, in the following description of the present disclosure, a detailed description of known functions and configurations incorporated herein will be omitted when it may make the subject matter of the present disclosure unnecessarily unclear. It will be understood that, although the terms "first," "second," etc. may be used herein to describe various components, these components should not be limited by these terms.

Figure 2:
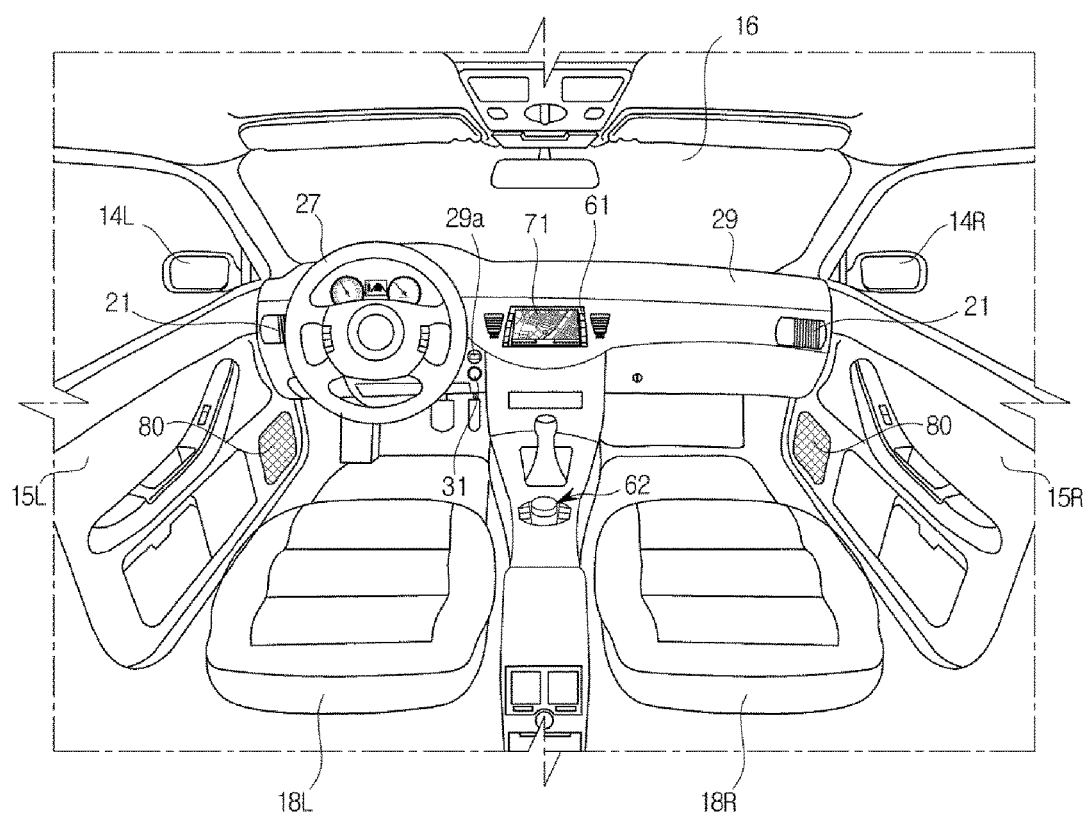
FIG. 2 is a view illustrating an internal configuration of a vehicle according to one embodiment.

FIG. 1 is an exterior view of a vehicle according to one embodiment, and FIG. 2 is a view illustrating an internal configuration of a vehicle according to one embodiment.

Referring to FIG. 1, an exterior of a vehicle 100 according to one embodiment includes wheels 12 and 13 which move the vehicle 100, doors 15L which shield the inside of the vehicle 100 from the outside, a front glass 16 which provides a view ahead of the vehicle 100 to a driver inside the vehicle 100, and side mirrors 14L and 14R which provide a view behind the vehicle 100 to the driver.

The wheels 12 and 13 include front wheels 12 provided in the front of the vehicle 100 and rear wheels 13 provided in the rear of the vehicle 100, and a driving device (not shown) provided inside the vehicle 100 provides rotatory power to the front wheels 12 or the rear wheels 13 so that the vehicle 100 moves forward or backward. Such a driving device may adopt an engine which generates the rotatory power by burning a fossil fuel or a motor which generates the rotatory power by receiving a power source from an electric condenser.

Doors 15L, 15R (FIG. 2) may be provided to be locked and unlocked in the left and right of a vehicle 100, a driver or a passenger is able to ride in the vehicle 100 when the doors are unlocked, and the inside of the vehicle is blocked from the outside when the doors are locked. Further, handles 17L and 17R which are able to lock and unlock the doors 15L and 15R (FIG. 2) may be provided outside the vehicle 100, and a low frequency (LF) antennas 111a and 111c (FIG. 3) which are able to transmit an LF signal and a touch sensing unit (not shown) which is able to sense a touch input of a user may be installed in the handle 17L.

In a state in which the user possesses a remote control device 200 (FIG. 3), the vehicle 100 may perform an authentication with the remote control device 200 (FIG. 3) through a wireless communication network when the touch sensing units of the doors 15L and 15R sense the touch input of the user, a door lock of the vehicle 100 may be released when the authentication is completed, and thus the door 15L may be unlocked by manipulation in which the user pulls the handles 17L and 17R. Here, the user may include a driver and a passenger riding in the vehicle, and mean a person possessing the remote control device 200.

The front glass 16 is provided on a forward top side of the body so that the driver inside the vehicle 100 may obtain visual information ahead of the vehicle 100, and the front glass 16 is also referred to as a windshield glass.

Further, the side mirrors 14L and 14R include a left side mirror 14L provided on the left side of the vehicle 100 and a right side mirror 14R provided on the right side thereof so that the driver inside the vehicle 100 may obtain visual information in lateral and rearward directions of the vehicle 100.

In addition, the vehicle 100 may include sensors such as a proximity sensor which senses obstacles or other vehicles behind or beside the vehicle 100, a rain sensor which senses rainfall and an amount of the rainfall, etc.

The proximity sensor may transmit a sense signal from a lateral or rear surface of the vehicle, and may receive a reflected signal reflected from an obstacle such as another vehicle or the like. Whether the obstacle exists at beside or behind the vehicle 100 may be sensed and a location of the obstacle may be detected on the basis of a waveform of the received reflected signal. As an example of such a proximity sensor, a method of emitting ultrasonic waves or infrared rays and calculating a distance up to an obstacle using the ultrasonic waves or infrared rays reflected from the obstacle may be adopted.

Referring to FIG. 2, an audio video navigation (AVN) display 71 and an AVN input unit 61 may be provided in a central region of a dashboard 29. The AVN display 71 may selectively display at least one of an audio screen, a video screen, and a navigation screen and, in addition, may display various types of control screens associated with the vehicle 100 or screens associated with additional functions.

The AVN display 71 may be implemented as a liquid crystal display (LCD), a light emitting diode (LED), a plasma display panel (PDP), an organic LED (OLED), a cathode ray tube (CRT), etc.

The AVN input unit 61 may be provided in a region adjacent to the AVN display 71 in a hard key type, or when the AVN display 71 is implemented as a touch screen type, a front surface of the AVN display 71 may be provided in a touch panel form.

Further, a center input unit 62 in a jog shuttle type may be provided between a driver's seat 18L and a passenger's seat 18R. A user may input a control command by rotating or pressing the center input unit 62 or by pushing the center input unit 62 in a vertical or lateral direction.

A sound output unit 80 capable of outputting sound may be provided in the vehicle 100, and the sound output unit 80 may be a speaker. The sound output unit 80 may output sound needed for performing an audio function, a video function, a navigation function, and other additional functions.

A steering wheel 27 is provided at the dashboard 29 in front of the driver's seat 18L, and a key groove 29a into which a smart key 200, e.g., a FOB key (see FIG. 3), is inserted may be formed in a region adjacent to the steering wheel 27. When the smart key 200 is inserted into the key groove 29a or a certification between the smart key 200 and the vehicle 100 is completed through a wireless communication network, the smart key 200 may be connected to the vehicle 100.

Further, a starting button 31 which on-off controls starting of the vehicle 100 may be provided at the dashboard 29, and when the smart key 200 is inserted into the key groove 29a or the certification between the smart key 200 and the vehicle 100 is successful through the wireless communication network, the starting of the vehicle 100 may be turned on by the starting button 31 being pressed by a user.

Meanwhile, an air conditioning device is provided in the vehicle 100 to perform both heating and cooling, and temperature inside the vehicle 100 may be controlled by discharging heated or cooled air through an air opening 21.

Figure 3:
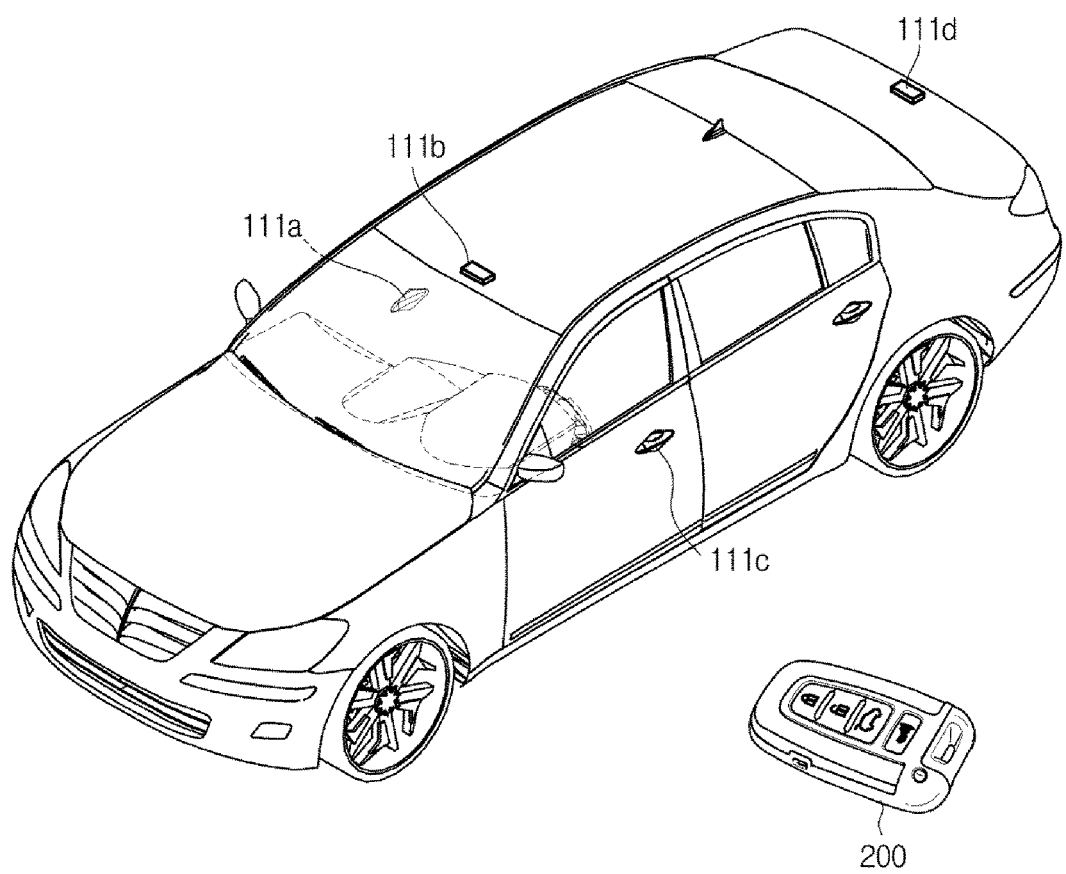
FIG. 3 is a diagram illustrating an example of a vehicle and a remote control device performing communication with the vehicle according to an embodiment of the present invention.

FIG. 3 is a diagram illustrating an example of a vehicle and a remote control device performing communication with the vehicle according to an embodiment of the present invention.

The remote control device 200 may be in direct contact with the vehicle 100, or be connected through transmission and reception of a wireless signal.

As an example shown in FIG. 3, the remote control device 200 may a key fob capable of releasing a door lock or staring an engine and driving the vehicle, by being connected to the vehicle 100.

The remote control device 200 according to an embodiment of the present invention shown in FIG. 3 may be any input device of releasing the door lock, or controlling the starting of the engine and the driving of the vehicle 100 as described above, in addition to the key fob. For example, when a mobile device performs a function of the remote control device, the remote control device 200 may include the mobile device. In this case, an application capable of performing the function of the remote control device 200 may be installed in the mobile device, and the mobile device may be sold after installing the application, and download the application from a server after being sold. Further, the mobile device may perform an authentication operation in order to operate as the remote control device 200 for the vehicle 100.

The remote control device 200 may be sold together with the vehicle 100, and authentication information for connecting to the vehicle 100 may be previously stored.

The remote control device 200 and the vehicle 100 may transceive a signal through an LF communication network and an RF communication network in order to perform a mutual authentication operation.

The LF communication network may be a communication network having a low frequency band of, for example, 25 kHz or more and 150 kHz or less, to be used so that the vehicle 100 transmits an LF signal needed for searching for the remote control device 200. When transceiving the LF signal through the LF communication network, a transceivable distance of a signal may be smaller than a transceivable distance of the RF communication network having a high frequency band due to a characteristic of the low frequency band. For example, the transceivable distance of the LF signal may be 5 m, and the transceivable distance of the RF signal may be 100 m.

Accordingly, the vehicle 100 may search for the remote control device 200 close to the vehicle 100, and request information needed for the authentication, by transmitting the LF signal through the LF communication network.

In order to transmit the LF signal, the vehicle 100 according to an embodiment of the present invention may include an LF transmitter 111, and the LF transmitter 111 may include one or more LF antennas 111a to 111d.

Each of the antennas 111a to 111d may be provided in the front, the rear, sides or the inside of a body of the vehicle 100, and transmit the LF signal having various angles and intensities. A reception intensity and a reception direction of the LF signal of the remote control device 200 may be changed according to positions of the LF antennas 111a to 111d.

Hereinafter, the LF antenna 111a provided in the handle 17R of the right door 15R, the LF antenna 111c provided in the handle 17L of the left door 15L, the LF antenna 111b provided in the top of the body, and the LF antenna 111d provided in a trunk are described as an example, but the positions of the LF antennas are not limited thereto.

When the vehicle 100 transmits the LF signal through the LF antennas 111a to 111d, the remote control device 200 according to an embodiment of the present invention may receive the LF signal transmitted from each of the LF antennas 111a to 111d.

The RF communication network may be a communication network having a frequency band in which the vehicle 100 receives the RF signal from the remote control device 200 receiving the LF signal, for example, a communication network having an ultra high frequency (UHF) band which is 300 MHz or more and 450 MHz or less. When transceiving the RF signal through the RF communication network, the transceivable distance of the signal may be greater than that of the LF communication network having the low frequency band.

Figure 4:
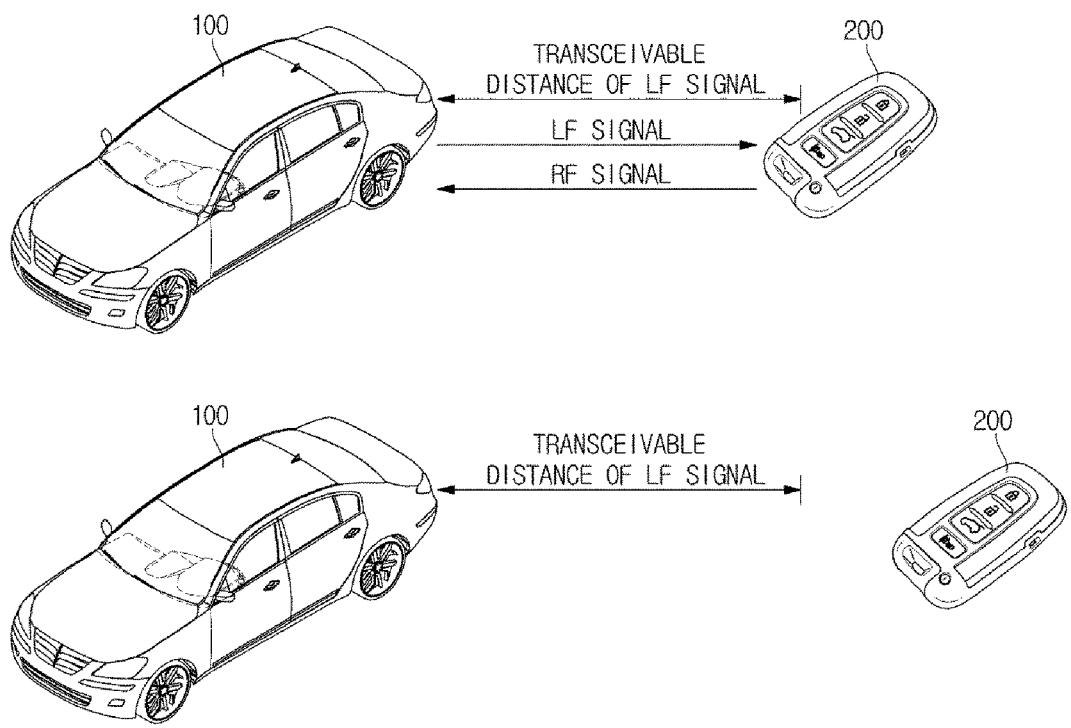
FIGS. 4 and 5 are drawings for describing an authentication operation between the vehicle and the remote control device performed at transceivable distances of various signals.
Figure 5:
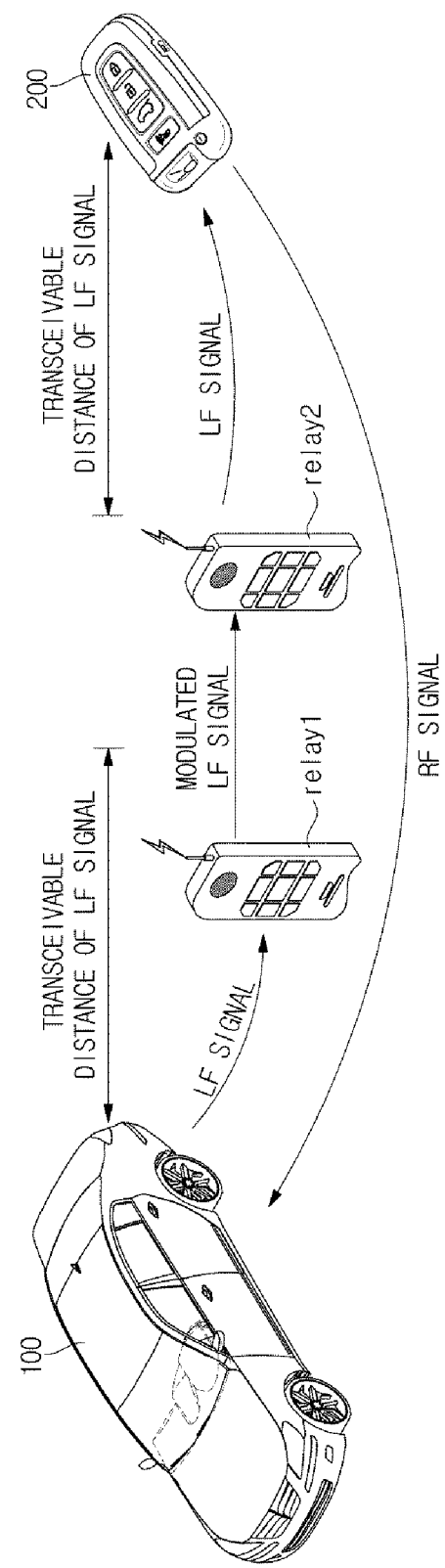

FIGS. 4 and 5 are drawings for describing an authentication operation between the vehicle and the remote control device performed at transceivable distances of various signals.

Referring to FIG. 4, when the remote control device 200 is present within the transceivable distance of the LF signal from the vehicle 100, the remote control device 200 may receive the LF signal from the vehicle 100 through the LF communication network, and transmit the RF signal to the vehicle 100 through the RF communication network.

On the other hand, when the remote control device 200 is not present within the transceivable distance of the LF signal from the vehicle 100, the remote control device 200 may not receive the LF signal even when the vehicle 100 transmits the LF signal through the LF communication network. The remote control device 200 of not receiving the LF signal may not transmit the RF signal which is a response signal to the vehicle 100.

However, referring to FIG. 5, even when the remote control device 200 is not present within the transceivable distance of the LF signal, the LF signal may be transmitted to the remote control device 200 when relays relay1 and relay2 trying a relay attack is involved in the process of transmitting the LF between the vehicle 100 and the remote control device 200.

In detail, when a first relay relay1 is present within the transceivable distance of the LF signal from the vehicle 100, a second relay relay2 is present within the transceivable distance of the LF signal from the remote control device 200, the first relay relay1 modulates the LF signal transmitted from the vehicle 100 into a signal having a high frequency band and transmits the modulated signal to the second relay relay2, and the second relay relay2 demodulates the LF signal into a signal having an original frequency band and transmits the demodulated signal to the remote control device 200, the LF signal may be transmitted to the remote control device 200 located at a long distance.

The first relay relays may modulate the frequency band of the LF signal transmitted from the vehicle 100 into the signal having the high frequency band in order to increase the transceivable distance of the LF signal.

The authentication operation may be abnormally completed as the remote control device 200 present within the transceivable distance of the RF signal of the vehicle 100 transmits the RF signal as a response signal to the vehicle 100.

Although not shown, even when the remote control device 200 is not present within the transceivable distance of the RF signal from the vehicle 100, the authentication operation may be abnormally completed as the relay present within the transceivable distance of the RF signal from the vehicle 100 and the remote control device 200 transmits the RF signal from the remote control device 200 to the vehicle 100.

The vehicle 100 and the remote control device 200 according to an embodiment of the present invention may include the following components in order to determine whether the relay is involved in the authentication operation between the vehicle 100 and the remote control device 200, that is, whether the relay attack is generated. Hereinafter, a configuration and a control method of the vehicle 100 according to an embodiment of the present invention will be described in detail.

Figure 6:
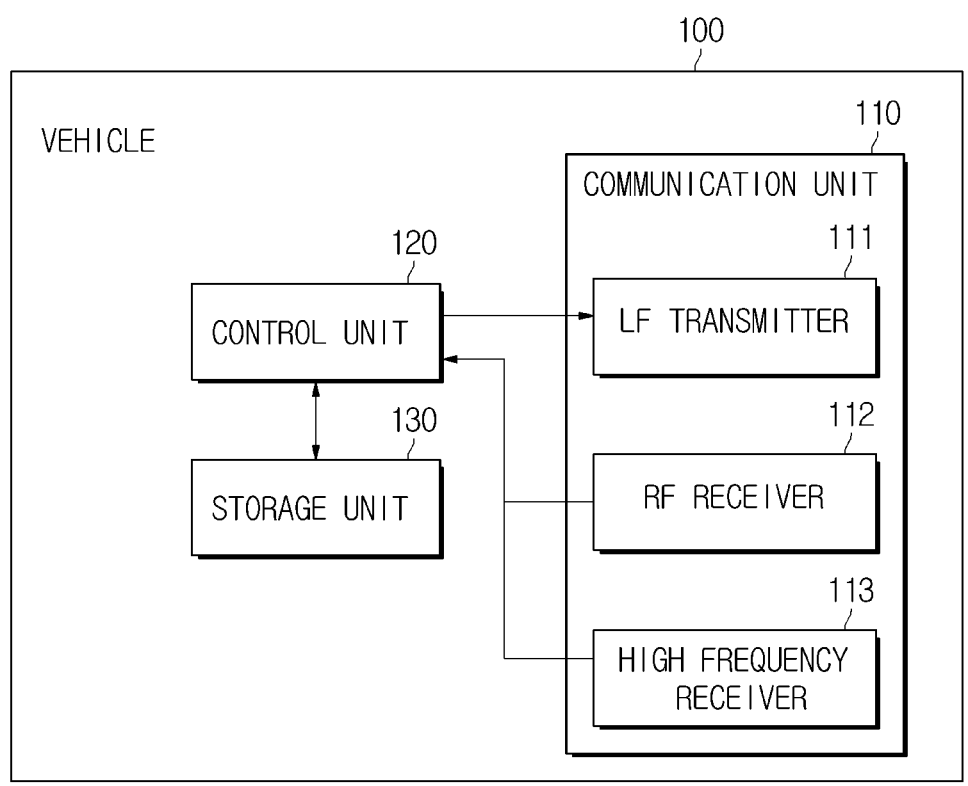
FIG. 6 is a control block diagram of a vehicle according to an embodiment of the present invention.

FIG. 6 is a control block diagram of a vehicle according to an embodiment of the present invention.

Referring to FIG. 6, the vehicle 100 according to an embodiment of the present invention may include a communication unit no transceiving a wireless signal, a control unit 120 controlling operations of components of the vehicle 100, and a storage unit 130 storing data.

The communication unit no of the vehicle 100 may include an LF transmitter 111 transmitting the LF signal within the transceivable distance of the LF signal through the LF communication network, an RF receiver 112 receiving the RF signal within the transceivable distance of the RF signal through the RF communication network, and a high frequency receiver 113 receiving a signal having a predetermined frequency band in the vehicle 100.

The LF transmitter 111 may include an LF communication interface including an LF antenna and an LF transmitter transmitting a wireless signal (that is, the LF signal) having a frequency band which is 20 kHz or more and 150 kHz or less. Further, the LF transmitter 111 may further include an LF signal modulation module modulating a digital control signal output from the control unit 120 through the LF communication interface into a wireless signal having an analog form according to control of the control unit 120.

A plurality of LF antennas may be provided in the vehicle 100, and the LF antennas may be provided in the front, the rear, sides, or the inside of the body, and transmit the LF signals having angles and intensities which are different from each other.

The LF antenna may include the LF antenna 111a provided in the handle 17R of the right door 15R, the LF antenna 111c provided in the handle 17L of the left door 15L, the LF antenna 111b provided in the top of the body, and the LF antenna 111d provided in the trunk, described above with reference to FIG. 3.

The RF receiver 112 may include an RF communication interface including an RF antenna and an RF receiver receiving a wireless signal (that is, the RF signal) having an UHF band which is 300 MHz or more and 450 MHz or less. Further, the RF receiver 112 may further include an RF signal demodulation module for demodulating the wireless signal having the analog form received through the RF communication interface into the digital control signal.

The control signal of the vehicle 100, the RF signal, and the LF signal may have formats different from each other.

The high frequency receiver 113 may include a high frequency communication interface including a high frequency antenna and a high frequency receiver receiving a predetermined frequency band which is higher than the reception frequency band of the RF receiver 112, for example, an industrial scientific and medical (ISM) frequency band which is 900 MHz or more. Further, the high frequency receiver 113 may further include a high frequency signal demodulation module demodulating the wireless signal having the analog form received through the high frequency communication interface into the digital control signal.

The high frequency receiver 113 may receive a high frequency signal in a plurality of predetermined frequency bands. For example, the high frequency receiver 113 may receive the high frequency signal in frequency bands which are 902 MHz or more and 928 MHz or less, 2.4 GHz or more and 2.5 GHz or less, and 5.725 GHz or more and 5.875 GHz or less.

In this case, the high frequency receiver 113 may include a plurality of high frequency signal demodulation modules demodulating the signals in the plurality of predetermined frequency bands, respectively.

The control unit 120 may control each of the components included in the vehicle 100.

The control unit 120 according to an embodiment of the present invention may determine whether the signal received by the high frequency receiver 113 is the modulated LF signal, and determine that the relay attack is generated when it is determined that the signal is the modulated LF signal.

In detail, the control unit 120 according to an embodiment of the present invention may control the LF transmitter 111 so that the LF signal including an identification (ID) mutually shared with the remote control device 200 is transmitted. Further, the control unit 120 may determine that the relay attack is generated when the ID mutually shared with the remote control device 200 is detected from the signal received by the high frequency receiver 113 based on a result obtained by demodulating the signal received by the high frequency signal demodulation module of the high frequency receiver 113.

When it is determined that the relay attack is generated, the control unit 120 may stop the operation in which the LF transmitter 111 transmits the LF signal even when the RF receiver 112 receives the RF signal, and determine that a normal authentication operation is not performed.

The control unit 120 according to another embodiment of the present invention may determine that the relay attack is generated when it is determined that the signal received by the RF receiver 112 and the high frequency receiver 113 is the modulated LF signal.

In detail, even when it is determined that the RF signal is received as a response signal with respect to the transmitted LF signal and the authentication information mutually shared by the remote control device 200 and the vehicle 100 is included in the received RF signal, the control unit 120 according to another embodiment of the present invention may determine that the relay attack is generated when the ID mutually shared with the remote control device 200 is detected from the signal received by the high frequency receiver 113 based on the result obtained by demodulating the signal received by the high frequency signal demodulation module of the high frequency receiver 113. Here, the authentication information mutually shared by the remote control device 200 and the vehicle 100 may be previously stored in the storage unit 130.

The control unit 120 according to still another embodiment of the present invention may control the high frequency receiver 113 to receive the signal in the frequency bands having a priority defined in the sequence which is from a high frequency band to a low frequency band.

In detail, the high frequency receiver 113 may receive the signal in the plurality of frequency bands according to performance, and the priority on each of the plurality of frequency bands may be stored in the storage unit 130. Here, a high priority may be given to the frequency band in which the relay attack can be most easily generated, and may be previously stored in a manufacturing operation or a setting operation.

The control unit 120 according to still another embodiment of the present invention may first receive a signal in a first frequency band having the highest priority, and determine that the relay attack is generated when the high frequency receiver 113 receives the signal in the first frequency band and the received signal is the modulated LF signal, but next may allow the high frequency receiver 113 to receive a signal in a second frequency band having a high priority subsequent to the first frequency band when a predetermined time is passed in a state in which the signal is not received in the first frequency band.

Next, the control unit 120 may determine that the relay attack is generated when the signal is received in the second frequency band and the received signal is the modulated LF signal, but next may allow the high frequency receiver 113 to receive a signal in a third frequency band having a high priority subsequent to the second frequency band when a predetermined time is passed in a state in which the signal is not received in the second frequency band.

As such, the control unit 120 may determine the frequency band of the signal received by the high frequency receiver 113 according to the priority of each of the frequency bands. Here, when the high frequency receiver 113 includes a plurality of high frequency signal demodulation modules demodulating signals of the plurality of frequency bands, respectively, each of the high frequency signal demodulation modules may demodulate the signal received in a corresponding frequency band according to a control signal of the control unit 120.

The control unit 120 may be implemented to include a memory (not shown) storing an algorithm for controlling operations of the components included in the vehicle 100 or data related to a program performing the algorithm, and a processor (not shown) performing the above-described operations using the data stored in the memory. In this case, the memory and the processor may be separately implemented as a chip. Optionally, the memory and the processor may be implemented in a single chip.

The ID and the authentication information mutually shared with the remote control device 200 may be stored in the storage unit 130.

Further, when the high frequency receiver 113 according to still another embodiment described above receives the signals in the plurality of frequency bands, the priority of each of the plurality of frequency bands may be stored in the storage unit 130.

The storage unit 130 may be implemented by at least one among storage media such as a non-volatile memory device such as a cache, a read only memory (ROM), a programmable ROM (PROM), an erasable PROM (EPROM), an electrically EPROM (EEPROM), and a flash memory, a volatile memory device such as a random access memory (RAM), a hard disk drive (HDD), and a compact disc-ROM (CD-ROM), but is not limited thereto. The storage unit 130 may be a memory implemented to be separate from the processor described above with respect to the control unit 120, and implemented as a single chip together with the processor.

At least one component may be added or deleted according to performance of the components of the vehicle 100 shown in FIG. 6. Further, it may be easily understood to those skilled in the art that the positions of the components may be changed according to the performance or a structure of the system.

Meanwhile, each of the components shown in FIG. 6 may be software and/or a hardware component such as a field programmable gate array (FPGA) and an application specific integrated circuit (ASIC).

Figure 7:
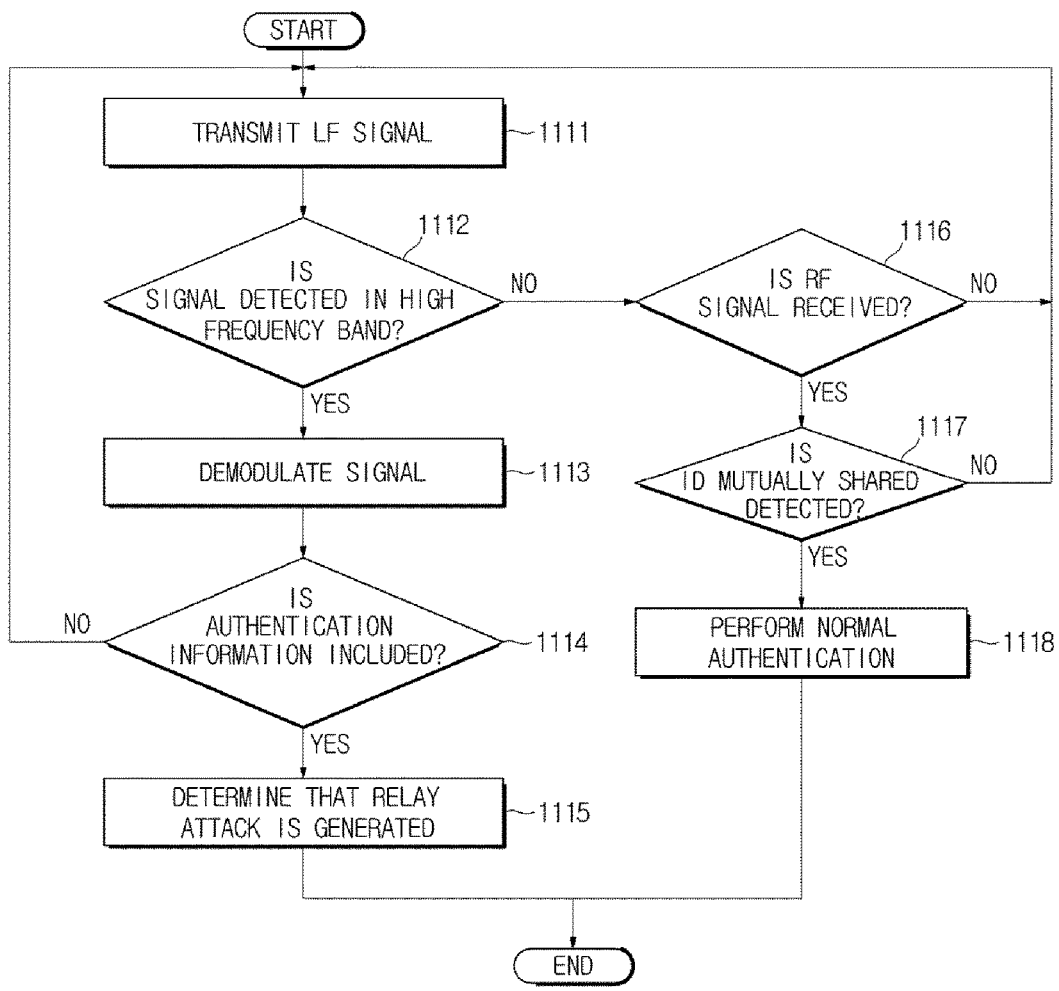
FIG. 7 is a flowchart for describing a method of controlling the vehicle according to an embodiment of the present invention.
Figure 8:
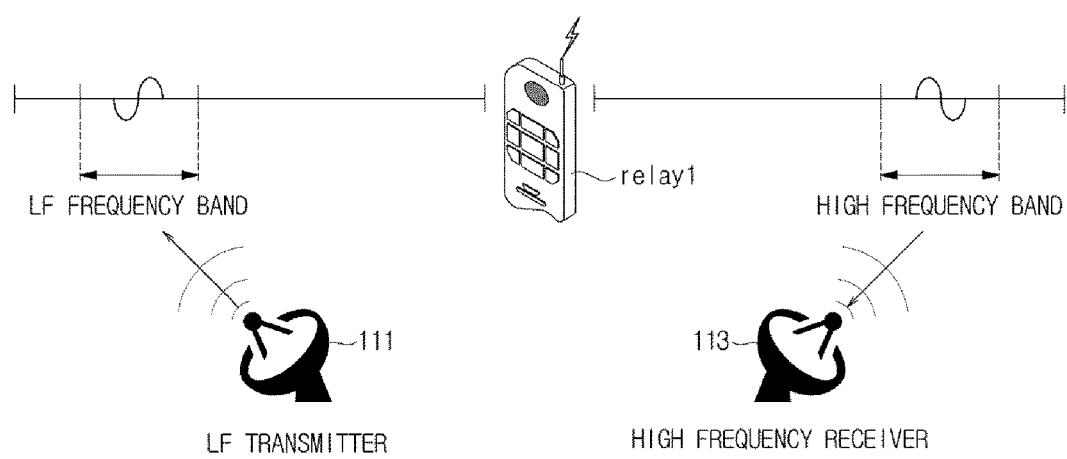
FIGS. 8 and 9 are conceptual diagrams illustrating results obtained by modulating the LF signal transmitted by the LF transmitter.
Figure 9:
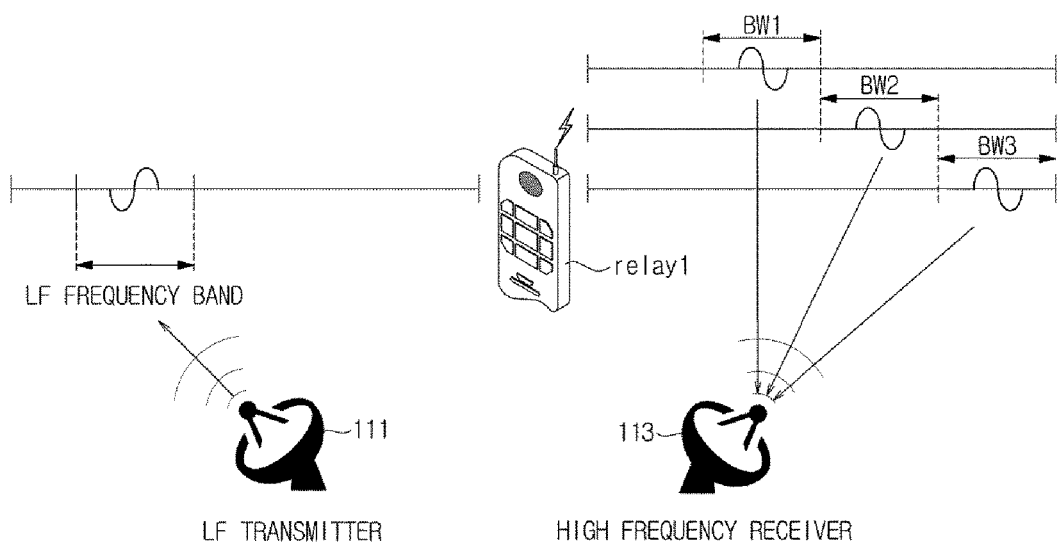

Hereinafter, referring to FIGS. 7 to 9, a method of controlling the vehicle 100 will be described in detail. FIG. 7 is a flowchart for describing a method of controlling the vehicle according to an embodiment of the present invention, and FIGS. 8 and 9 are conceptual diagrams illustrating results obtained by modulating the LF signal transmitted by the LF transmitter.

Since each of components of the vehicle 100 which will be described hereinafter is the same as each of the components of the vehicle 100 described above with reference to FIGS. 1 to 6, like reference numerals represent like components.

Referring to FIG. 7, the LF transmitter 111 of the vehicle 100 according to an embodiment of the present invention may transmit the LF signal around the vehicle 100 (1111). Here, a range around the vehicle 100 may include a region which is within the transceivable distance of the LF signal, and be changed according to performance of the LF transmitter 111.

Next, when the high frequency antenna of the high frequency receiver 113 of the vehicle 100 according to the embodiment of the present invention receives the signal in the predetermined frequency band ("Yes" of 1112), the high frequency signal demodulation module may demodulate the received signal (1113).

In detail, referring to FIG. 8, the LF transmitter 111 may periodically transmit the LF signal in the LF frequency band which is 20 kHz or more and 150 kHz or less even when the remote control device 200 is not present around the vehicle 100. In this case, the relay relays present around the vehicle 100 may allow the LF signal to reach the remote control device 200 by modulating the LF signal transmitted by the LF transmitter 111 into the signal having a high frequency band, and allow the LF signal to reach the remote control device 200 even when the remote control device 200 is not present around the vehicle 100.

The control unit 120 of the vehicle 100 according to an embodiment of the present invention may not approve the control of the vehicle 100 according to a normal authentication operation by determining that the relay attack is generated when the high frequency receiver 113 receives the LF signal modulated by the relay relays (1115 of FIG. 7).

The determining of whether the high frequency receiver 113 receives the LF signal modulated by the relay relays may include determining whether the ID mutually shared by the vehicle 100 and the remote control device 200 is included in the signal demodulated by the high frequency signal demodulation module of the high frequency receiver 113 (1114 of FIG. 7).

Further, referring to FIG. 9, the control unit 120 of the vehicle 100 according to another embodiment of the present invention may control the high frequency receiver 113 to receive the signal in the sequence which is from a high frequency band having a high priority to a low frequency band having a low priority (for example, in the sequence of $BW_1$ to $BW_3$) when the high frequency receiver 113 is implemented to be able to receive the signal in each of the plurality of predetermined frequency bands ($BW_1$ to $BW_3$).

In this case, when the plurality of high frequency signal demodulation modules are provided in the high frequency receiver 113 and the high frequency signal demodulation modules demodulate the received signals in the corresponding frequency bands ($BW_1$ to $BW_3$), respectively, the control unit 120 may control the plurality of high frequency signal demodulation modules to sequentially demodulate from the high frequency signal demodulation module demodulating the signal in the high frequency band having the high priority.

Referring to FIG. 7 again, the control unit 120 of the vehicle 100 may determine that the normal authentication operation is performed when the high frequency receiver 113 does not receive the signal ("No" of 1112) and the RF receiver 112 receives the RF signal ("Yes" OF 1116) (1118).

Here, according to another embodiment of the present invention, the control unit 120 may determine that the normal authentication operation is performed when the high frequency receiver 113 does not receive the signal ("No" of 1112), the RF receiver 112 receives the RF signal ("Yes" of 1116), and the authentication information mutually shared by the vehicle 100 and the remote control device 200 is included in the RF signal ("Yes" of 1117) (1118).

However, the control unit 120 of the vehicle 100 may control the LF transmitter 111 to again transmit the LF signal when the RF signal is not received ("No" of 1116), the authentication information mutually shared by the vehicle 100 and the remote control device 200 is not included in the RF signal ("No" of 1117), or the ID mutually shared by the vehicle 100 and the remote control device 200 is not included in the modulated LF signal received by the high frequency receiver 113 ("No" of 1114).

According to the above-described embodiments of the present invention, the vehicle may easily determine whether the relay attack is generated by only confirming whether the same signal as the LF signal transmitted by the vehicle is transmitted in the predetermined frequency band after the vehicle transmits the LF signal.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle, comprising:
   a low frequency transmitter configured to transmit a LF signal in order to search for a remote control device;
   a high frequency receiver configured to receive a signal having a predetermined frequency band that is higher than a frequency band of the LF signal transmitted by the low frequency transmitter, wherein the high frequency receiver is configured to receive signals having a plurality of predetermined frequency bands;
   a storage unit configured to store a priority on each of the plurality of predetermined frequency bands, wherein the high frequency receiver is configured to receive the signal in the frequency bands defined from a higher priority frequency band to a lower-priority frequency band; and
   a control unit configured to determine that a relay attack is generated when the signal received by the high frequency receiver is a modulated LF signal.

2. The vehicle of claim 1, further comprising a radio frequency receiver configured to receive an RF signal including authentication information;
   wherein the high frequency receiver is configured to receive a signal having a predetermined frequency band that is higher than a frequency band of the RF signal; and
   wherein the control unit is configured to determine that the relay attack is generated when the RF signal is received and the signal received by the high frequency receiver is the modulated LF signal.

3. The vehicle of claim 2, further comprising a second storage unit configured to store authentication information mutually shared with the remote control device; and
   wherein the control unit is configured to determine that the relay attack is generated when the authentication information included in the RF signal is equal to the authentication information stored in the storage unit and the signal received by the high frequency receiver is the modulated LF signal.

4. The vehicle of claim 1, wherein the high frequency receiver comprises a plurality of high frequency signal demodulation modules configured to demodulate signals in the plurality of predetermined frequency bands, respectively.

5. The vehicle of claim 1, wherein the high frequency receiver comprises a high frequency signal demodulation module configured to demodulate the signal.

6. The vehicle of claim 5, wherein the low frequency transmitter transmits the LF signal including an identification (ID) mutually shared with the remote control device; and
   wherein the control unit is configured to determine that the relay attack is generated when the ID is detected based on a result demodulated by the high frequency signal demodulation module.

7. The vehicle of claim 1, wherein the control unit is configured to stop transmitting the LF signal when determining that the relay attack is generated.

8. A method of controlling a vehicle, the method comprising:
   transmitting a LF signal in order to search for a remote control device;
   receiving a signal having a plurality of predetermined frequency bands that are each higher than a frequency band of the LF signal, wherein a priority on each of the plurality of predetermined frequency bands is previously set and wherein the signal is received in the frequency bands defined from a higher priority frequency band to a lower-priority frequency band; and
   determining that a relay attack is generated when the signal received in the receiving of the signal is a modulated LF signal.

9. The method of claim 8, wherein, before the determining of that the relay attack is generated, the method further comprises receiving an RF signal that includes authentication information;
   wherein receiving the signal comprises receiving a signal having a predetermined frequency band that is higher than a frequency band of the RF signal; and
   wherein determining that the relay attack is generated comprises determining that the relay attack is generated when the RF signal is received and the signal received in the receiving of the signal is the modulated LF signal.

10. The method of claim 9, wherein determining that the relay attack is generated comprises determining that the relay attack is generated when the authentication information included in the RF signal is equal to authentication information stored in the vehicle and the signal received in the receiving of the signal is the modulated LF signal.

11. The method of claim 8, wherein receiving the signal comprises demodulating the signal in each of the plurality of predetermined frequency bands.

12. The method of claim 8, wherein receiving the signal comprises demodulating the signal.

13. The method of claim 12, wherein transmitting the LF signal comprises transmitting an LF signal that includes an identification (ID) mutually shared with the remote control device; and
   wherein determining that the relay attack is generated comprises determining that the relay attack is generated when the ID is detected based on a result obtained in the demodulating of the signal.

14. The method of claim 8, further comprising stopping the transmitting of the LF signal when it is determined that the relay attack is generated.

15. A method of controlling a vehicle, the method comprising:
   transmitting a LF signal in order to search for a remote control device;
   receiving a signal having a plurality of predetermined frequency bands that are each higher than a frequency band of the LF signal, wherein a priority on each of the plurality of predetermined frequency bands is previously set and wherein the signal is received in the frequency bands defined from a higher priority frequency band to a lower-priority frequency band;
   receiving an RF signal that includes authentication information the RF signal in a frequency band that is lower that the predetermined frequency bands of the signal;
   determining that a relay attack is generated when the RF signal is received and the signal received in the receiving of the signal is a modulated LF signal;
   stopping the transmitting of the LF signal when it is determined that the relay attack is generated.

16. The method of claim 15, wherein determining that the relay attack is generated comprises determining that the relay attack is generated when the authentication information included in the RF signal is equal to authentication information stored in the vehicle and the signal received in the receiving of the signal is the modulated LF signal.

17. The method of claim 15, wherein receiving the signal comprises demodulating the signal in each of the plurality of predetermined frequency bands.

18. The method of claim 17, wherein transmitting the LF signal comprises transmitting an LF signal that includes an identification (ID) mutually shared with the remote control device.

19. The method of claim 18, wherein determining that the relay attack is generated comprises determining that the relay attack is generated when the ID is detected based on a result obtained in the demodulating of the signal.

\* \* \* \* \*